Inventors
Robert A. Baum
John R. MacRill

By Lyon & Lyon
Attorneys

Patented June 22, 1948

2,443,795

UNITED STATES PATENT OFFICE 2,443,795

CITRUS WRAPPER

John R. MacRill, Ontario, and Robert A. Baum, Claremont, Calif., assignors to Fernstrom Paper Mills, Inc., Pomona, Calif., a corporation of California Application June 19, 1945, Serial No. 600,382

6 Claims. (Cl. 117—154)

This invention relates to citrus wrappers, and more particularly to a wrapper of tissue paper for citrus fruits such as oranges, grapefruit, lemons, limes, and the like, which is impregnated with a mixture of wax, mineral oil and pine oil, or alpha terpineol, to improve the quality of such wrappers in preserving the quality of the citrus fruit with respect to taste, shrinkage, appearance, and to control the moulding of such fruit during shipping, holding, or storage thereof.

We have discovered that through the utilization of pine oil, or the active ingredient thereof, alpha terpineol, as incorporated in a citrus paper wrapper, that we are able to effect a distinct improvement in citrus fruit that is held or stored and is wrapped with a tissue paper wrapper which is impregnated with the said pine oil, or alpha terpineol, carried in the wax and mineral oil solution utilized for controlling the porosity and other characteristics of the paper whereby the fruit is enclosed within an envelope which permits the fruit cells to "live" while controlling the development of mould spores in the fruit or passage of mould spores through the tissue to the fruit during storage or holding. (By "holding" or "storage" we mean any retention of wrapped fruit from the time of picking to the time of delivery to the ultimate consumer, whether the same be in mechanical refrigerated storage, or merely the time lapse between the picking, processing, shipping and delivery to the ultimate consumer.)

We have further found that by use of pine oil or its active ingredient, alpha terpineol, that we are able to control the development of mould in or on the fruit without imparting a foreign taste to the fruit or the juice thereof.

By proper control of the quantity and mixture of wax, mineral oil and pine oil, or alpha terpineol, we have also found that we are able to maintain a shrinkage control superior to that heretofore accomplished through the use of ordinary citrus wrappers or impregnated citrus wrappers as the same are now found upon the market so that the loss of weight in fruit during shipping or holding is reduced to a point where it is most advantageous in maintaining the appearance and taste characteristics of the fruit without so inhibiting the natural process of living cells of the fruit as to result in deterioration of the fruit from either the standpoints of taste or appearance.

A further important factor of our invention is that the material which we employ for controlling mould development is nontoxic in character and is selective and specific to the types of mould commonly infesting citrus fruit, such as *Penicillium digitatum* and *Penicillium italicum*.

It is therefore an object of this invention to provide a citrus wrapper which is efficient in the preservation of taste and appearance of citrus fruit wrapped therein and which will likewise act to control the moulding of the fruit and the shrinkage thereof during the time it is wrapped.

Another object of this invention is to provide a citrus wrapper which is impregnated with pine oil or its active ingredient, alpha terpineol, and which is effective in controlling the moulding of the fruit without being of a toxic character and which does not impart a foreign taste to the citrus fruit, juice or peeling thereof.

Another object of this invention is to provide a citrus wrapper which is impregnated with an oil and wax mixture which will provide for the maximum of control of the loss of weight of the fruit or shrinkage thereof without at the same time resulting in a depreciation of the flavor value or appearance of the fruit.

Other objects and advantages of this invention it is believed will be apparent from the hereinafter set forth description of the preferred embodiment of our invention.

In the drawings

In accordance with our invention, a standard tissue wrapper is commonly employed for the wrapping of citrus fruit and is treated with a mixture of paraffin wax and mineral oil in which pine oil or its active ingredient in the control of mould infestation, that is, alpha terpineol, is carried. The proportions of wax and oil are preferably 25% paraffin wax and 75% white mineral oil. The quantities of wax of course may be varied and the variation of the percentages of this mixture will be found to determine the shrinkage control of the fruit wrapped therein.

Figure 1:
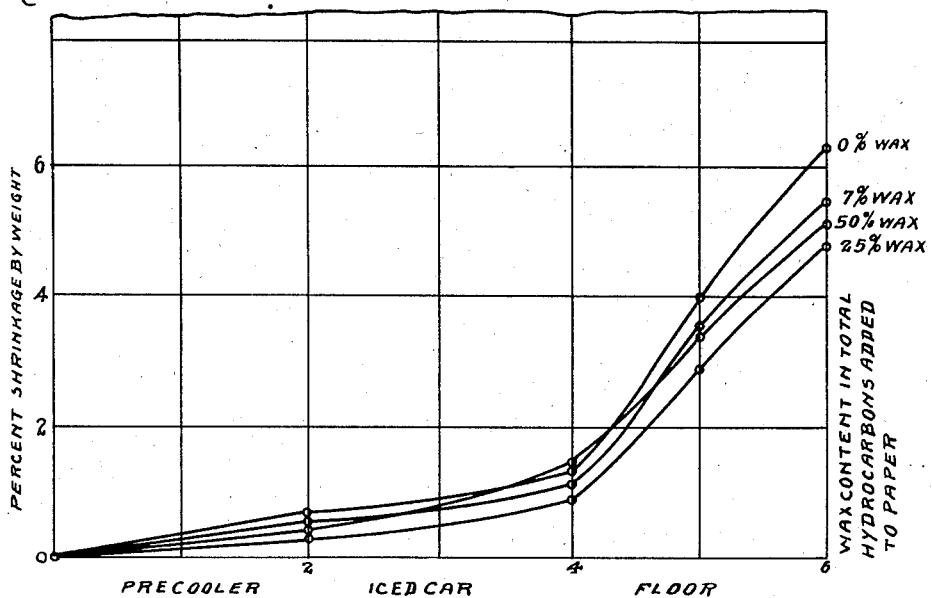
Figure 1 is a graph illustrating the loss in weight of the fruit or shrinkage as plotted against the quantity of wax with which the fruit wrapper is impregnated.

In Figure 1 of the drawings we have illustrated the variations which will be effected through the utilization of varying quantities of wax as carried in the mineral oil with which the tissue wrapper is impregnated. Figure 1 represents a determination of amount of shrinkage of the fruit by weight throughout varying conditions of holding of the fruit over periods of weeks. During the first two weeks of holding of this fruit the same was held in a precooler where the fruit was stored under controlled temperature and humidity conditions standard in the practice of holding oranges. Between the second and fourth weeks the fruit was held in an ice car representative of the practice of holding fruit during transportation. From the fourth to the sixth week the fruit was held on the floor, conditions representative of the conditions of display for sale of such fruit without temperature or humidity control. The fruit thus stored were navel oranges which had been subjected to the ordinary packing house procedure of cleaning, waxing, and the customary mould control through the utilization of the customary washing procedures carried out in a packing house. The fruit was packed in the ordinary standard shipping containers.

It will be apparent from Figure 1 that a 25% wax to 75% mineral oil impregnating mixture resulted in the minimum weight loss of the fruit throughout the storage or handling conditions; that the standard type of wrap represented by a 7% wax to 93% mineral oil impregnated paper resulted in a greater loss weight of the fruit similar to the loss occasioned through the increasing of the wax content of the mineral oil mixture to 50%. The control of the loss of weight through the utilization of these wax and mineral oil impregnated papers is shown by comparison with the utilization of the same paper carrying no wax. This latter paper of course exhibited the greatest shrinkage loss.

We have found that a 25% wax to 75% mineral oil solution represents the optimum mixture, that is, gives us the minimum loss in weight during holding the fruit. The paper containing a 25% wax to 75% mineral oil is not as impervious as paper containing a greater quantity of wax, so that it is apparent that control of the porosity of the paper to prevent the interchange of gases in the envelope within the wrapper is not determinative of the loss of weight of the fruit by shrinkage.

It is well known that the cells of such fruit as oranges or other citrus fruit must "breathe" during storage if the fruit is to be maintained in a satisfactory condition. To stop the breathing of the cells of the fruit results in rapid deterioration of the fruit. It has been shown by our investigation that this rate of breathing may be effectively controlled to give a minimum of loss of weight of the fruit without deleterious effects to the taste and appearance of the fruit.

Figure 2:
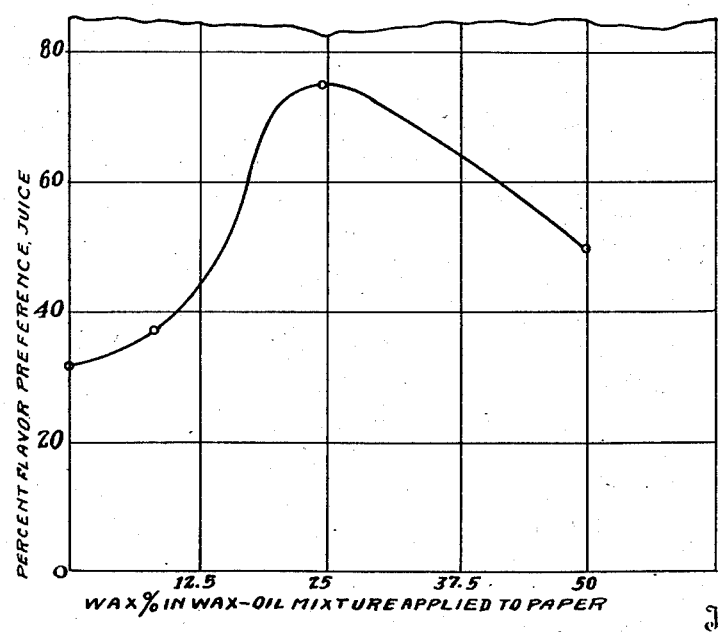
Figure 2 is a graph illustrating a flavor preference as plotted against varying proportions of wax incorporated in the citrus wrapper.

In Figure 2 we have plotted the taste preference of the fruit juice against the percentage of wax in the wax-mineral oil emulsion as applied to the paper and it is shown by this curve that the optimum percentage of wax in the wax-mineral oil mixture is again 25%, showing that maintaining an accurate control of the shrinkage likewise gives the greatest flavor advantage during storage.

The paper constituting the wrap embodying our invention is impregnated with paraffin and mineral oil solution to the extent of 13% to 15% of the bone dry weight of the paper. To this preferred mixture of paraffin wax and mineral oil we add the pine oil or alpha terpineol in the percentages of from 1% to 3% pine oil. We have found that to materially increase the percentage of pine oil in the oil and wax solution will produce a skin condition of the fruit indicating the beginning of injury to the fruit due to the presence of too great a quantity of pine oil in the wrap. The indication of injury is first found by darkening of the skin or surface of the fruit. This darkening of the surface of the fruit is indicative of collapse of the fruit cells. Representative of the proportions of the alpha terpineol which may be utilized in the place of pine oil in our experiments have shown that alpha terpineol is the active ingredient of pine oil which enables us to effectively control the moulding of the fruit within the wrappers, and alpha terpineol represents approximately 60% of the pine oil with which we have experimented. The range of alpha terpineol would therefore be on a comparative basis between .6% and 1.8% of the bone dry weight of the paper.

A very important consideration in the use of pine oil, or alpha terpineol, is found in the very low phenol coefficient of these materials. The phenol coefficient of pine oil is 7, which shows its very low toxicity. We have found, however, that both pine oil and alpha terpineol are specific for the common forms of mould which develop in citrus fruit and which are, for example, *Penicillium digitatum* and *Penicillium italicum*. Due to the fact that pine oil and alpha terpineol are non-toxic, there is no danger in the use of these materials in the citrus wrapper.

A further very important result accomplished through the use of these materials is found in the fact that they do not impart a flavor to the fruit wrapped therein. This is shown in the following tables. In conducting the determinations as shown by these tables, the fruit was stored under standard conditions of holding and a comparison was made between the common form of citrus wrapper heretofore utilized in the industry and in which wrappers the fruit of the same batch was wrapped as a control. Fruit from the same batch was wrapped in a diphenyl impregnated wrapper obtained from the Crown Zellerbach Corporation, assignee of Letters Patent No. 2,173,453, granted September 19, 1939, and the wrapper embodying our invention wherein 2% pine oil was utilized in the oil and wax solution. It was shown upon these determinations that a definite taste was imparted to the fruit through the utilization of the diphenyl wrap; that pine oil impregnated paper produced the greatest flavor preference; that the standard wrap lay intermediate in flavor preference between these two extremes.

The table of these determinations is:

*Table I.—Orchard run navels*

| Type Wrapper | Per cent decay after mould inoculation for 7 days | Per cent Shrinkage | Flavor Preference | Rating |
|---|---|---|---|---|
| Standard (control) | 6.90 | 3.86 | Intermediate | 10 |
| Diphenyl | 4.75 | 2.85 | Poorest | 17 |
| Pine oil | 3.70 | 2.44 | Best | 21 |

In this table there is also shown the control of the shrinkage of the fruit showing that the pine oil-paraffin wax-mineral oil-impregnated paper embodying our invention gave the lowest weight loss to the fruit. In this table we have also given the results of the determination of the mould infestation control showing the percentage of the loss of fruit due to mould decay.

a taste to the citrus fruit wrapped therein. The taste is imparted to the fruit by such toxic materials, not only in the fruit itself, but in the juice and in the peeling.

We have likewise employed alpha terpineol in various forms for the impregnation of the tissue wrappers and a comparison of the decay control

*Table II—Orchard run navels*

| Type Wrapper | Per Cent Decay | | Total weight loss Per Cent | | Flavor Preference | | Rating |
|---|---|---|---|---|---|---|---|
| | 3-29-45 | 4-27-45 | 3-29-45 | 4-27-45 | 3-29-45 | 4-27-45 | |
| Standard (control) | 13.70 (1) | 6.90 (1) | 10.60 (1) | 3.86 (1) | Intermediate (2) | Intermediate (2) | 8 |
| Diphenyl | 7.05 (2) | 4.75 (2) | 7.32 (3) | 2.85 (2) | Poorest (1) | Poorest (1) | 11 |
| Pine Oil | 5.68 (3) | 3.70 (3) | 8.32 (2) | 2.44 (3) | Best (3) | Best (3) | 17 |

A further experimental run gave the following results:

*Table III—Flavor tests on extracted juice (navel oranges)*

| Fruit Type | Paper Type | Taster | | | | | | |
|---|---|---|---|---|---|---|---|---|
| | | 1 | 2 | 3 | 4 | 5 | 6 | 7 |
| Orchard Run 3-29-45 | Standard Wrap Control | Normal | Sli-off | Good | Flat | Excellent | OK | Good. |
| | Diphenyl | Diphenyl | Diphenyl | Off-Flavor | Diphenyl | Very poor | Off Flavor | Bad. |
| | Pine Oil 2% | Best | Best | Best | Good | Excellent | OK | Good. |
| Injured and Inoculated 4-20-45 | Standard Wrap Control | Fair | Fair | Sli-Stale | Fair | Stale | Poor | Flat. |
| | Diphenyl | Diphenyl | Poor | Off | Poor | Poor | Diphenyl | Off Flavor. |
| | Pine Oil 2% | Fair | Tart | Good | Fair | Best | Flat | Fair. |
| Orchard Run 4-27-45 | Standard Wrap Control | Good | Very flat | Best | Good | Good | Stale | Sli-off. |
| | Diphenyl | Very poor | Fair | Poorest | Poor | Sli-off | Poor | Flat. |
| | Pine Oil 2% | Good | Flat | Good | Good | Good | Fair | Good. |

| Fruit Type | Paper Type | Taster | | | | | No. of individuals giving highest preference to juice | |
|---|---|---|---|---|---|---|---|---|
| | | 8 | 9 | 10 | 11 | 12 | | |
| Orchard Run 3-29-45 | Standard Wrap Control | Insipid | Fair | | | | 3 | |
| | Diphenyl | Diphenyl | Poor | | | | 0 | |
| | Pine Oil 2% | OK | Good | | | | 9 | Total number of preference for three taste tests |
| Injured and Inoculated 4-20-45 | Standard Wrap Control | Foul | Stale | Normal | Off | Fair | 3 | |
| | Diphenyl | Good | Poor | Poor | do | Off | 1 | |
| | Pine Oil 2% | Fair | Fair | Normal | OK | Very good | 10 | |
| Orchard Run 4-27-45 | Standard Wrap Control | | | | | | 4 | 10 |
| | Diphenyl | | | | | | 1 | 2 |
| | Pine Oil 2% | | | | | | 5 | 24 |

Table III is a tabulation of the taste preference tests of orange juice as packed in the control paper being normally the commonly used type of wrapper as against the same fruit wrapped in diphenyl paper and paper impregnated with pine oil. A tabulation of the taste preference of those different types of impregnation shows in every case a marked preference for the juice extracted from fruit wrapped in paper embodying our present invention and further shows the deleterious effect of the taste of the fruit wrapped in the diphenyl-treated paper. It is definitely shown by these tests that toxic substances of the character of diphenyl impart in this type wrapper as compared with the standard wrapper shows:

*Table IV.—Navel oranges*

| Type Wrapper | Orchard Run Per Cent Shrinkage | Orchard Run Per Cent Decay (Mould) | Orchard Run Taste Preference |
|---|---|---|---|
| Standard (control) | 5.35 | 19.8 | Intermediate. |
| Diphenyl | 3.19 | 17.3 | Poorest. |
| Pine Oil 1% | 2.43 | 1.2 | |
| Pine Oil 2% | 2.75 | 4.9 | Best. |
| Pine Oil 4% | 2.64 | 10.0 | |

As indicated by Table IV in connection with the determination made with orchard run navel oranges, the standard wrap which was used as a control showed the greatest percentage of decay and the diphenyl impregnated wrap of the Crown Zellerbach Corporation gave an improvement in the percentage of decay over the standard wrap. The improvement, however, was not marked. The greatest decrease in loss of fruit due to decay or mould was shown where the fruit was wrapped with 1% pine oil impregnated wrapper calculated upon a bone dry basis of the weight of the paper. The taste preference, however, was for the fruit which was wrapped in the wrapper containing a higher percentage of alpha terpineol.

The control of shrinkage of the fruit through the use of the alpha terpineol impregnated paper containing 25% paraffin wax and 75% mineral oil as compared with the diphenyl impregnated paper and the standard wrap was again favorable to the paper of our invention, showing, however, very little difference between the papers containing the different percentages of alpha terpineol complex.

Another extremely important factor in the preservation of citrus fruit during holding or storage is the maintenance of the appearance of the fruit. We have found that any impregnated paper which carries a material which will act upon the surface of the citrus fruit to produce a pitting thereof should be avoided because of the degrading appearance of the fruit by such pitting. For this reason it is desirable to use only such quantities of pine oil or alpha terpineol in the impregnation of the tissue wrapper as will not produce the pitting thereof. We have found that with use of percentages higher than 3% of pine oil that there is a tendency toward the pitting of the fruit skin and correspondingly pitting will occur with the higher percentages of alpha terpineol, although we have not found that such pitting results when the total alpha terpineol utilized in the wrap amounts to 3% of the paper weight figured on a bone dry basis.

Another important factor which is indicative of the surprising results obtained through the use of pine oil and alpha terpineol for the control of the decay of citrus fruits have been found from the fact that these same materials do not function to maintain a control or to inhibit the development of mold in citrus fruit when the pine oil or alpha terpineol is sprayed onto the fruit or the alpha terpineol is used in water in which the fruit is immersed.

The wax and mould-inhibiting agent are impregnated in the paper through the medium of the mineral oil which acts as a carrying solvent. Other well known solvents might be employed in the impregnation of the paper. The carrying of the mould-inhibiting agent in the solvent mineral oil and wax provides for an effective way of dispersing the mould-inhibiting agent through the paper.

We have found that where the fruit is wrapped in a pine oil, or alpha terpineol-impregnated, wrapper as hereinabove defined, that all traces of the pine oil active agent, that is, alpha terpineol, disappears within three to six days after the fruit is wrapped. The period of time above given is dependent upon the condition of holding of the fruit, that is, the temperature of storage and conditions of humidity, and may vary considerably. However, the mould inhibition accomplished by the wrapping of the fruit controlled by the pine oil or alpha terpineol-impregnated paper is not lost when there is no further discernible trace of the active ingredient, that is, alpha terpineol.

Having fully described our invention, it is to be understood that we do not wish to be limited to the details herein set forth, but our invention is of the full scope of the appended claims.

We claim:

1. A preservative wrapper for citrus fruit, comprising, tissue paper impregnated with a solution of paraffin in mineral oil, said solution also containing between approximately 0.6 and 1.8% of alpha terpineol based on the bone dry weight of said paper.

2. A preservative wrapper for citrus fruit, comprising, tissue paper impregnated with a solution of paraffin in mineral oil, said solution also containing pine oil in an amount providing between 0.6 and 1.8% alpha terpineol based on the bone dry weight of said paper.

3. A preservative wrapper for citrus fruit, comprising, tissue paper impregnated with a solution of paraffin in white mineral oil, said solution containing between approximately 7 and 50% paraffin based on the total weight of the solution and also containing between approximately 0.6 and 1.8% of alpha terpineol based on the bone dry weight of said paper.

4. A preservative wrapper for citrus fruit, comprising, tissue paper impregnated with a solution of paraffin in white mineral oil, said solution containing between approximately 7 and 50% paraffin based on the total weight of the solution and also containing between approximately 0.6 and 1.8% of alpha terpineol based on the bone dry weight of said paper, the amount of said solution in said wrapper ranging from approximately 13 to 15% of the bone dry weight of said paper.

5. A preservative wrapper for citrus fruit, comprising, tissue paper impregnated with a solution of paraffin in white mineral oil, said solution containing approximately 25% paraffin based on the total weight of the solution and also containing between approximately 0.6 and 1.8% of alpha terpineol based on the bone dry weight of said paper.

6. A preservative wrapper for citrus fruit, comprising, tissue paper impregnated with a solution of paraffin in white mineral oil, said solution containing approximately 25% paraffin based on the total weight of said solution, and also containing between approximately 0.6 and 1.8% of alpha terpineol based on the bone dry weight of said paper, the amount of said solution in said wrapper ranging from approximately 13 to 15% of the bone dry weight of said paper.

JOHN R. MacRILL.
ROBERT A. BAUM.

REFERENCES CITED

The following references are of record in the file of this patent:

UNITED STATES PATENTS

| Number | Name | Date |
| --- | --- | --- |
| 437,322 | Ayres | Sept. 30, 1890 |
| 1,809,016 | Brogden et al. | Mar. 2, 1925 |
| 2,084,062 | Nedvidek et al. | June 15, 1937 |

FOREIGN PATENTS

| Number | Country | Date |
| --- | --- | --- |
| 474,666 | Great Britain | Nov. 1, 1937 |